Nov. 19, 1963  D. BUCCICONE  3,111,311
SHEET CONVEYOR FOR HANDLING ODD SHAPED MATERIALS
Original Filed Feb. 1, 1960  8 Sheets-Sheet 2

INVENTOR.
Dario Buccicone
BY
Cromwell Greist & Warden
Attys.

Nov. 19, 1963  D. BUCCICONE  3,111,311
SHEET CONVEYOR FOR HANDLING ODD SHAPED MATERIALS
Original Filed Feb. 1, 1960  8 Sheets-Sheet 7

INVENTOR.
Dario Buccicone,
BY
Cromwell, Greist & Warden
Attys

Nov. 19, 1963

D. BUCCICONE

3,111,311

SHEET CONVEYOR FOR HANDLING ODD SHAPED MATERIALS

Original Filed Feb. 1, 1960

INVENTOR.
Dario Buccicone
BY
Cromwell, Greist + Warden

United States Patent Office 3,111,311
Patented Nov. 19, 1963

3,111,311
SHEET CONVEYOR FOR HANDLING ODD
SHAPED MATERIALS
Dario Buccicone, Gary, Ind., assignor to Buccicone Engineering Co., Inc., Gary, Ind., a corporation of Indiana
Original application Feb. 1, 1960, Ser. No. 5,888, now Patent No. 3,055,659, dated Sept. 25, 1962. Divided and this application May 10, 1962, Ser. No. 193,839
8 Claims. (Cl. 271—45)

This invention relates to apparatus for piling metal sheets as they are delivered from an oscillating shear and is more particularly concerned with improvements in a piler which is capable of handling sheets which are non-rectangular in shape.

This is a division of Serial No. 5,888, filed February 1, 1960, now U.S. Patent No. 3,055,659.

Normally in the manufacturing or processing of metal sheet material, the sheets which are delivered by the shear are of rectangular shape and of uniform size so that all sheets may be conveniently piled uniformly in one or more stacks. In some cases, however, odd shaped or non-rectangular sheets may be desired, that is, sheets which are in the form of parallelograms or triangles may be cut from a continuous web or strip by means of an oscillating shear and advanced therefrom. This results in successive sheets which are unalike and raises a problem of piling because it is not possible to make a satisfactory pile of such sheets by stacking successive sheets one on the other. For this type of operation it is desirable to provide a piler which will stack every other sheet in a separate pile. Also, when the oscillating shear is employed to provide odd shaped sheets the strip being cut is first moved forward and then held motionless during the cutting stroke. This makes it necessary to provide special equipment for receiving the sheet from the shear and for delivering the same to the piler conveyor. If an ordinary belt conveyor is employed, it must be stopped each time the strip is stopped or the sheet will rub on the traveling belt and cause wear and deterioration of the same as well as possible damage to the sheet. If the belt conveyor is to be stopped, considerable additional mechanism must be provided and, of course, the operation is slowed down appreciably, which is undesirable. It is an object, therefore, of the present invention to provide a piler apparatus which is specially designed for receiving odd shaped sheets from an oscillating shear and for depositing alternate sheets in separate piles in a continuous operation.

It is a more specific object of the invention to provide a sheet piler wherein a special entry or feed conveyor receives odd shaped sheets from an oscillating shear and advances the sheets to an overhead magnetic conveyor in the piler and wherein the piler has specially designed mechanism for depositing alternate sheets in separate piles.

It is another object of the invention to provide a sheet piler of the type in which the sheets are dropped onto a pile from an overhead magnetic conveyor wherein mechanism is provided for handling sheets of non-rectangular shape with alternate sheets having a different shape and with the mechanism being operative to deposit the sheets automatically in separate piles whereby sheets of like shape are accumulated in the same pile.

It is a further object of the invention to provide in an overhead magnetic conveyor type sheet piler mechanism a specially designed entry conveyor which is adjustable to receive sheets of odd shape from an oscillating shear and to forward the same to the overhead magnetic conveyor which entry conveyor has special means for supporting the sheets thereon while their forward movement is interrupted during the shearing operation and for advancing the sheets immediately they are cut.

These and other objects and advantages of the invention will be apparent from a consideration of the apparatus which is shown by way of illustration in the accompanying drawings wherein.

The sheet piler which is illustrated in the drawings is adapted for piling in two separate piles sheets which are delivered to the piler from a shear which operates to cut from the leading edge of a traveling web successive sheets of non-rectangular shape, for example, sheets of triangular or paralellogram shape, with the shear cut being made diagonally across the web, and with each successive cut being at the same angle relative to the longitudinal center line of the web but in planes which are on opposite sides of a vertical transverse plane so that the sheets or pieces delivered by the shear are identical in size and shape but adjoining or successive sheets face in opposite directions.

Figure 1:
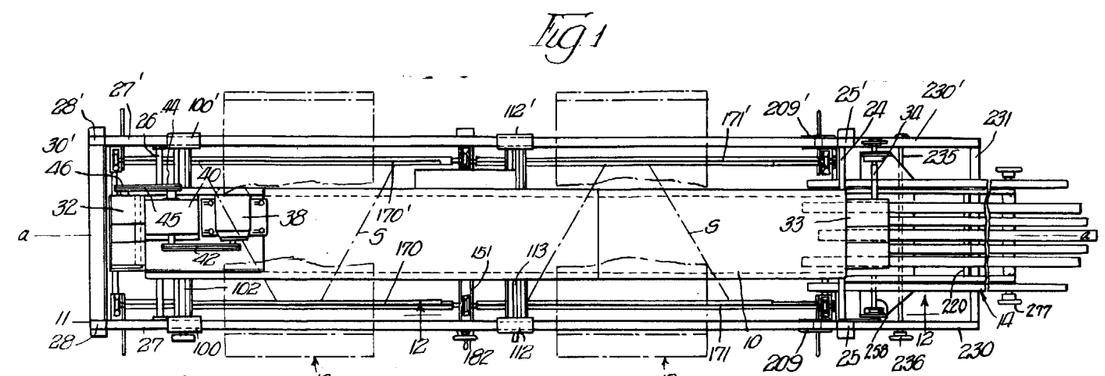
FIGURE 1 is a plan view of a sheet piler having incorporated therein the principal features of the invention, with portions thereof broken away and other portions omitted.

The piler comprises an overhead conveyor 10 (FIGURES 1 to 3) of the multiple rail unit type which extends longitudinally on an upright supporting frame structure 11, with the latter being divided longitudinally to provide two piling areas 12 and 13. A feed conveyor 14 at the entry end of the piler receives the sheets from the shear (not shown) and delivers the successive sheets to the bottom surface of the overhead conveyor 10 which is operated to deposit the sheets in alternate succession on the pile supporting buggies 15 and 16 which are arranged in the piling areas 12 and 13, respectively. An end stop 17 and a back stop 18 are provided on the frame 11 in the piling area 12 for stopping and guiding the sheets onto the pile on the buggy 15 while an end stop 20 and a back stop 21 are provided in the piling area 13 for stopping and guiding the sheets which are delivered to this area onto the pile accumulated on the buggy 16.

Figure 2:
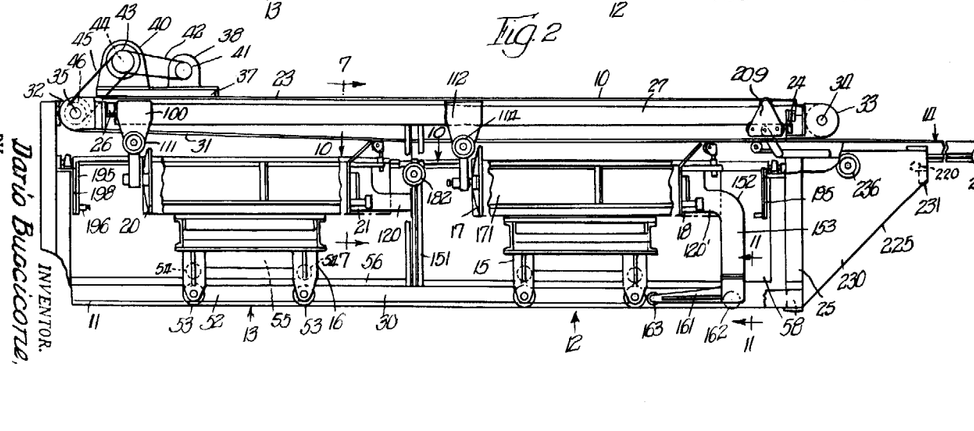
FIGURE 2 is a side elevation of the sheet piler with portions broken away.

The overhead conveyor 10, as illustrated, comprises two magnetic rail units 22 (FIGURE 3) which are of the type disclosed in Patents Nos. 2,486,733; 2,527,911 and 2,642,174, and which comprises an elongate frame with one or more endless traveling belts carried at opposite ends thereof on supporting pulleys and having a series of electromagnets longitudinally spaced in the frame above the lower run of the belts with the frame being downwardly bowed in the lengthwise direction as shown in FIGURE 2. The two identical rail units 22 extend longitudinally of the machine and are arranged in parallel, equal spaced relation on opposite sides of the longitudinal center line of the machine which is indicated at a—a in FIGURE 1. The two rail units 22, which are tied together by a top plate 23, are supported at the entry end of the piler on a cross beam 24 extending between the upright corner posts 25 and 25' of the frame 11. They are supported at the opposite end of the piler on the cross beam 26 which extends between the top side rails 27 and 27', the latter connecting the corner posts 25 and 25' at one end of the frame 11 with like corner posts 28 and 28' at the opposite end of the frame 11. The corner posts 25, 28 and 25', 28' are tied together at their bottom ends by longitudinally extending bottom side rails 30 and 30', respectively. The conveyor rail units 22 each comprise traveling belts 31 supported at opposite ends of the unit on driven and idler pulleys 32 and 33, respectively, the pulleys 33 being mounted on an idler shaft 34 and the pulleys 32 being mounted on a driven shaft 35. The top cover plate 23 on the two conveyor rail units 22 supports at one end a conveyor drive mechanism which comprises a base 37 having mounted thereon a drive motor 38 and a gear unit 40. The drive motor 38 has its drive pulley 41 connected by a belt 42 with the pulley 43 on the gear unit 40. The gear unit 40 has an output shaft which carries a sprocket 44 which is connected by a drive chain 45 with a sprocket 46 on the driven shaft 35 for operating the conveyor rail units 22. Each of the rail units 22 is provided with suitable electromagnets (not shown) arranged in proper spaced relation immediately above the lower run of the traveling belts 31 so that the sheets S delivered to the bottom of the conveyor 10 may be held against the traveling belts 31 by controlling the strength of the electromagnets. The sheets may be dropped as desired by the operator or automatically for delivery to the two piles in the piling areas 12 and 13. The magnets may be controlled by switches which are actuated by passage of the sheets, such as inducto switches or an electric eye, so as to release the sheets in the order desired and at the proper point along the bottom of the conveyor for deposit on the piles in the two piling areas 12 and 13.

The pile supporting buggies 15 and 16 provided in the two piling areas 12 and 13 of the piler are identical and are supported in like manner on the frame 11. Consequently, only one of these will be described in detail. The buggy 16 (FIGURE 3) comprises a generally rectangular frame 50 which is disposed transversely of the main frame 11 and which has rotatably mounted therein a plurality of spaced rollers 51. The rollers 51 extend slightly above the top surface of the frame 50 with their axes extending in the longitudinal direction of the machine and are adapted to support thereon a pile of sheets. The frame 50 is supported at each of its ends by an end frame comprising a laterally spaced depending pair of plates 52 having longitudinally spaced skate rollers 53 rotatably supported at the bottom thereof which provides a four point movable support for the frame 50 on the floor on which the piler is mounted. A pair of guide wheels or rollers 54 are rotatably supported in longitudinally spaced relation in a housing 55 depending from the center of the frame 50. The guide wheels 54 are grooved on their periphery for engaging a track formation 56 on a longitudinally extending center beam 57 secured between the bottom cross beams 58 and 58' which connect the bottom ends of the end posts 25, 25' and 28, 28', respectively. The two buggies 15 and 16 may be moved longitudinally of the machine within the piling areas 12 and 13 to the proper position for receiving the plates in piled relation thereon and any convenient arrangement may be provided for locking the buggies in their adjusted position.

Figure 4:
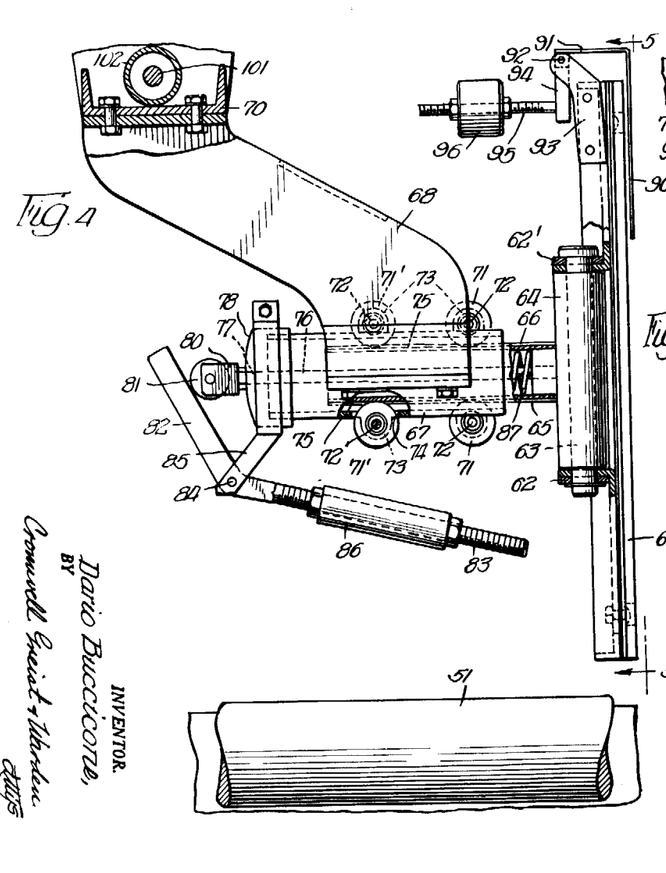
FIGURE 4 is a vertical longitudinal section taken on the line 4—4 of FIGURE 3, to an enlarged scale.
Figure 5:
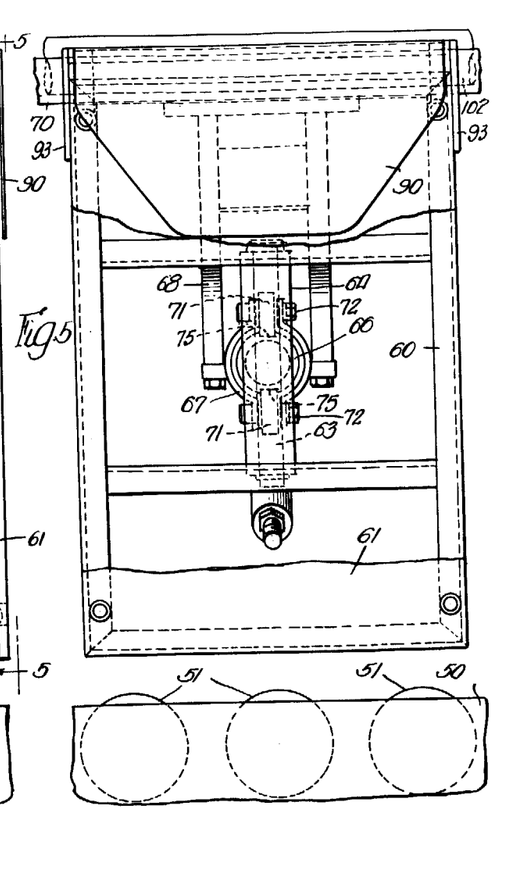
FIGURE 5 is a vertical cross section taken on the line 5—5 of FIGURE 4.

The end stop or bumper members 17 and 20 (FIGURES 2 to 5) are identical in construction and are mounted for adjustment longitudinally of the machine by identical mechanism. The end stop 20 (FIGURES 4 and 5) comprises a rectangular pad supporting frame or bracket member 60 having a pad 61 of resilient material, such as, rubber or similar material, on the face thereof which is directed toward the sheet receiving or entry end of the machine. The pad bracket 60 has a pair of vertically spaced, projecting lugs 62, 62' on the back face thereof which are vertically aligned and apertured to receive a mounting pin 63 for pivotally supporting the pad bracket 60 on a vertically disposed cylindrical member 64 forming the head of a T-shaped bracket 65. The stem portion 66 of the bracket 65 is also cylindrical with one end secured intermediate the top and bottom ends of member 64 and having its other end open. The stem 66 is disposed in a horizontal plane and extends longitudinally of the machine. It is telescoped within a spring housing 67 which is in the form of a cylindrical section and which is secured to the lower end of a double plate depending support bracket or frame 68, the latter being secured at its upper end to a cross frame channel support 70. The spring housing 67 is provided with two axially spaced pairs of guide rollers 71, 71 and 71', 71' which are rotatably mounted on the pins 72 and 72'. The pins 72 and 72' are journaled in pairs of suitable bearing ears 73 provided on the housing 67 and arranged so that the rollers extend through apertures 74 in the wall of the housing and engage in guideway forming grooves 75 in the top and bottom of the stem 66 so as to provide a floating support for the stem 66 within the housing 67. A rod 76, which is threaded at both ends, extends from the inner end of the plunger member 66 through an aperture 77 in a cap 78 on the free end of the housing 67 and carries on its free end a clevis 80 having a rotatably mounted roller 81 thereon which roller 81 engages the upwardly angled end portion 82 of a weighted lever 83. The lever 83 is pivoted at 84 on a bracket 85 which is secured on the cap member 78 and carries in adjustable relation thereon a weight 86, the latter being threaded on the downwardly inclined arm of lever 83. The clevis 80 is larger than the aperture 77 and limits the movement of the piston-like stem member 66 in the direction of the face of the frame 60. A compression spring 87 is carried on the rod 76 which absorbs the force exerted by the sheets when they strike the pad 61, the weighted lever 83 providing an adjustable means for supplementing the shock absorbing power of the spring 87.

A pivotally mounted auxiliary bumper plate 90 (FIGURES 4 and 5) is provided at the top of the frame 60 which has a vertical portion extending along the top of the pad 61 and a rearwardly projecting flange 91 which is secured along its edge to a pivoted mounting shaft 92. The shaft 92 is journaled at its ends in the upwardly and rearwardly inclined portions of angular support brackets 93 which are secured to opposite sides of the top portion of the frame 60. The mounting shaft 92 has the shorter vertical leg 94 of an angle bracket secured thereto at the free end thereof with the longer horizontal leg 95 in the form of a threaded pin on which a counterweight 96 is adjustably mounted for normally holding the plate 90 in a vertical plane spaced slightly from the face of the pad 61.

Figures 3, 6:
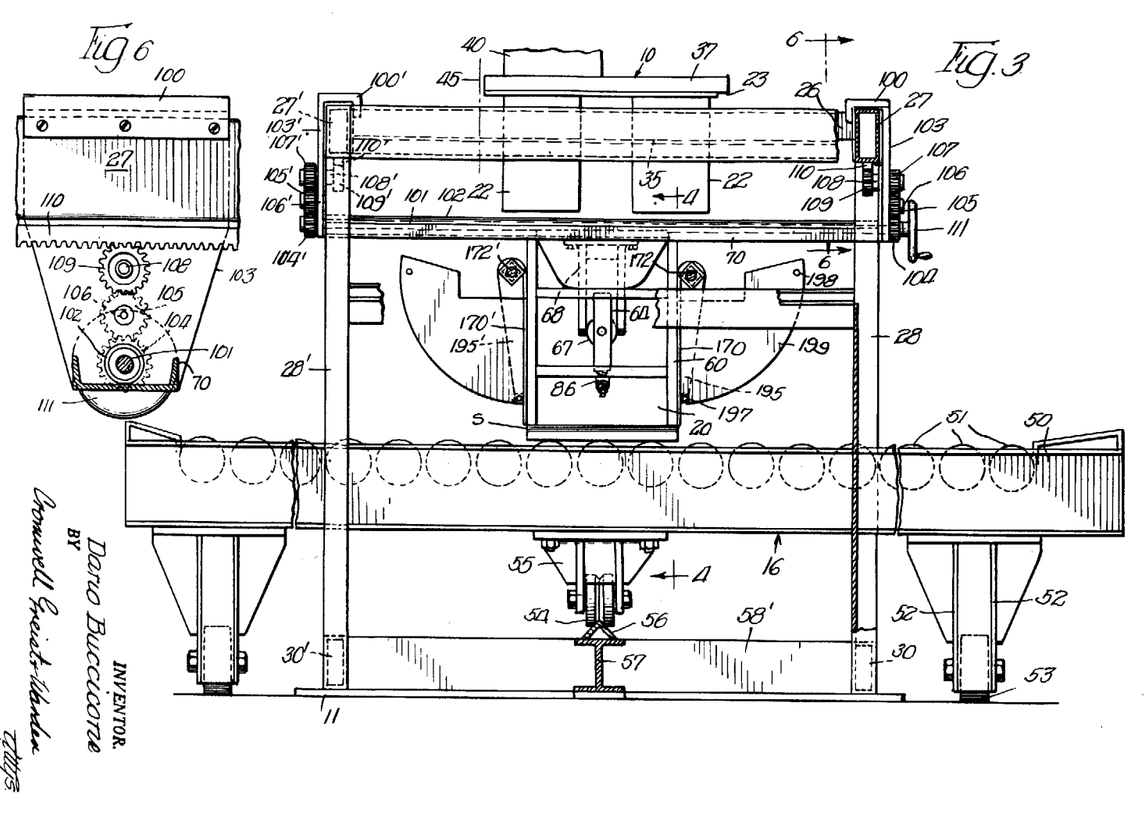
FIGURE 3 is an end view of the piler, to an enlarged scale and with portions broken away, the view being taken at the discharge end of the machine.
FIGURE 6 is a fragmentary vertical, longitudinal section taken on the line 6—6 of FIGURE 3 to an enlarged scale.

The cross channel member 70 which supports the end stop mechanism is mounted on the top side rail members 27 and 27' of the main frame 11 by means of carriage forming members 100 and 100' (FIGURES 1 to 3 and 6) so that the end stop mechanism may be adjusted in the lengthwise direction of the machine. The carriage members 100 and 100' are of inverted J-shaped form and provided with suitable slide plates for mounting the same in sliding relation on the top side frame members 27 and 27' the latter being rectangular in cross section, as shown in FIGURE 3. A motion equalizing mechanism for adjusting the position of the carriages 100 and 100' is provided which comprises a cross shaft 101 (FIGURES 3 and 4) mounted in a pipe section 102 which forms a housing therefor above the channel 70 and which is connected at its opposite ends to the depending portions of the carriage side plates 103 and 103'. The shaft 101 is journaled in the depending portions of the vertically disposed plates 103 and 103' of the carriages 100 and 100' and carries on its opposite ends pinions 104 and 104' which engage idler pinions 105 and 105', the latter being mounted on the stub shafts 106 and 106'. The idler pinions 105 and 105' engage with pinions 107 and 107' which are on the outer ends of shafts 108 and 108', also journaled in the vertical plates 103 and 103' and carrying on their inner ends pinions 109 and 109' which engage with fixed racks 110 and 110' secured on the bottom of the side rails 27 and 27'. The shaft 101 is provided at one end with a hand wheel 111 so as to provide for hand adjustment of the end stop mechanism 20 in the direction longitudinally of the machine.

Figures 13, 14:
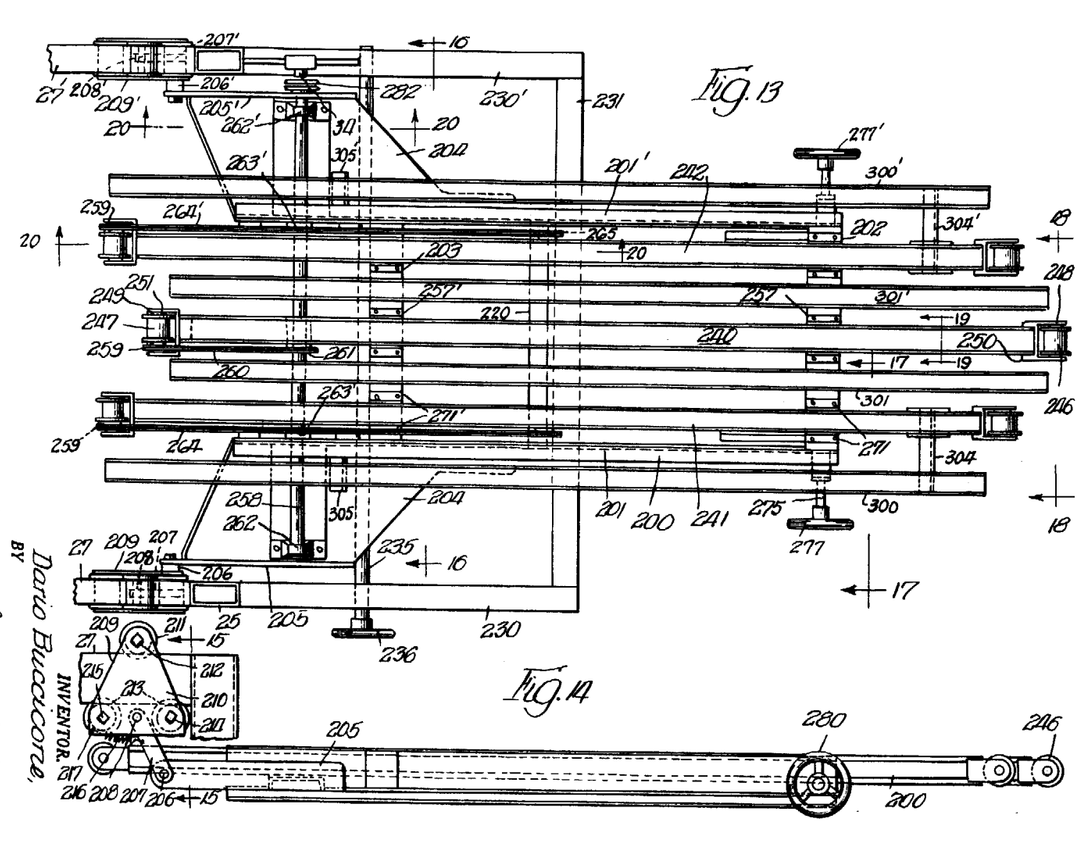
FIGURE 13 is a partial plan view, showing the feed conveyor at the entry end of the machine, to an enlarged scale and with portions omitted.
FIGURE 14 is a partial side elevation at the entry end of the piler, with portions broken away and other portions omitted, the view showing the feed conveyor of FIGURE 13.

The end stop mechanism 17 (FIGURES 1 and 2) in the piling area 12 and the end stop mechanism 20 are identical and the details of the mountings for these two mechanisms are identical except that the carriages 112 and 112' for the end stop mechanism 17 are arranged so that the vertical plate members are disposed on the inside of the top side rails 27 and 27' instead of on the outside thereof as shown in FIGURE 13. This enables the gear train between the equalizing shaft and the racks to be positioned immediately beneath the racks, eliminating the need for pinions corresponding to 107 and 107' and permitting direct engagement with the racks by pinions corresponding to 105 and 105'. The motion equalizing shaft 113 is provided with a hand wheel 114 so as to permit manual adjustment of the end stop mechanism 17 longitudinally of the machine within the piling area 12.

Figures 7, 8, 9:
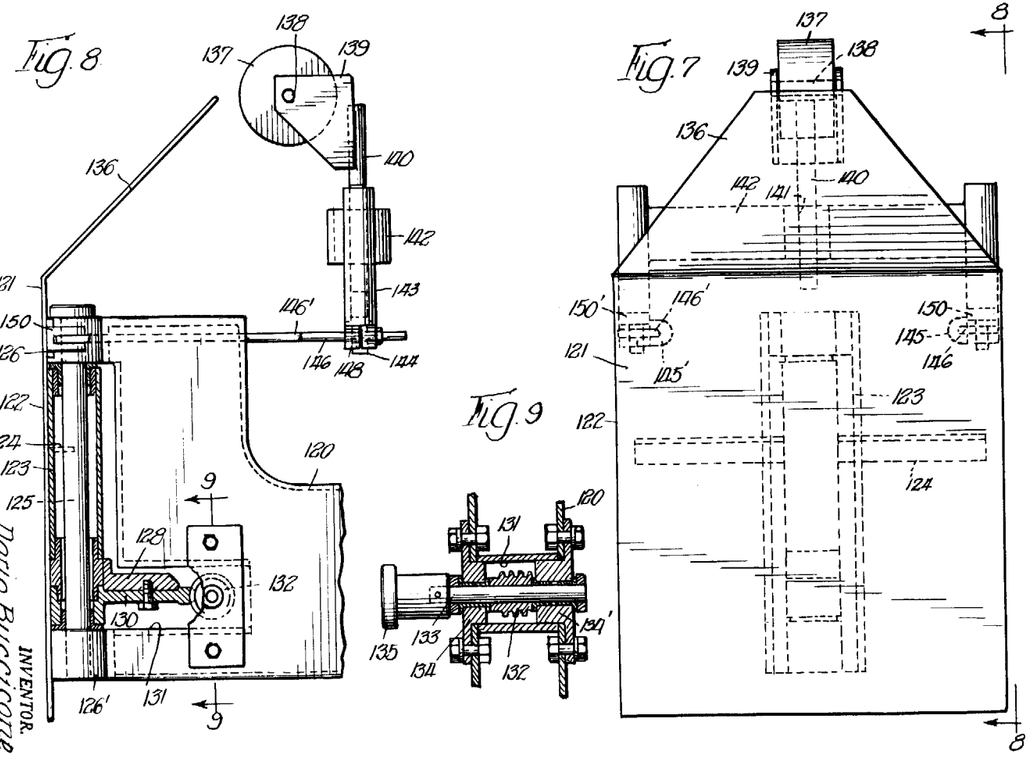
FIGURE 7 is a partial vertical cross section taken on the line 7—7 of FIGURE 2, to an enlarged scale.
FIGURE 8 is a view taken on the line 8—8 of FIGURE 7 with portions broken away.
FIGURE 9 is a fragmentary cross section taken on the line 9—9 of FIGURE 8.
Figure 10:
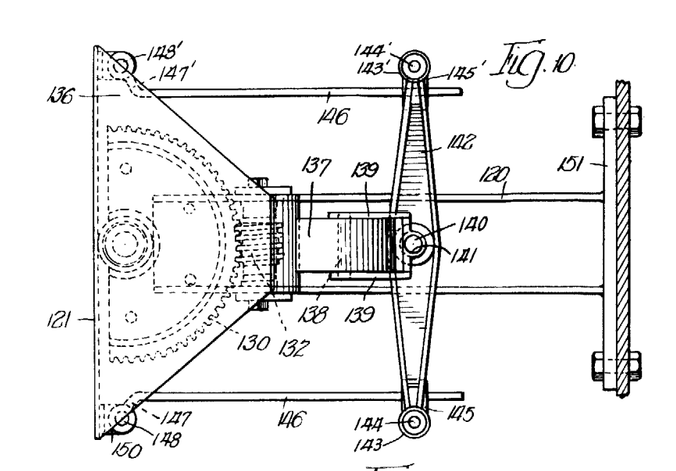
FIGURE 10 is a partial horizontal section taken on the line 10—10 of FIGURE 2 to an enlarged scale.

The back stop mechanism 21 which cooperates with the end stop mechanism 20 for controlling the piling in the piling area 13 is mounted on a fixed bracket 120 (FIGURES 2 and 7 to 10) and is pivotally movable, within a limited range, about a vertical axis. The back stop plate 121 (FIGURES 7 and 8) has a lower vertical portion 122 secured to a support member which is in the form of an elongate, vertically disposed cylinder 123 and angle bars 124 extending laterally of the bearing member 123, the plate section 122 being secured to the angle members 124. The cylinder 123 houses a vertically disposed mounting pin 125 which has its end secured in the vertically aligned bores in a pair of vertically spaced bearing members 126 and 126' which extend forwardly of the front face of the fixed supporting bracket or frame 120. The support cylinder or sleeve 123 carries at its lower end a horizontal segment plate 128 and a gear segment 130 which is secured on the bottom face of the plate 128. The gear segment 130 and its supporting plate 128 extend into a recess 131 formed in the supporting bracket 120 and a manual control for rotating the sleeve 123 is provided which comprises a pinion gear 132 (FIGURES 8 and 9) mounted on a cross shaft 133 which is supported in a pair of spaced bearing members 134 and 134' at the inner end of the recess 131. The shaft 133 carries on its outer end an operating knob 135 and the gear 132 is in engagement with the segment 130 so that rotation of the knob 135 turns the sleeve 123 about the axis of the vertical pin 125 and adjusts the angular position of the back stop plate 121.

The top portion 136 of the back stop plate 121 (FIGURES 7 to 10) is inclined upwardly and has inwardly converging side edges so as to provide a truncated triangular shape which terminates at its upper or narrow edge at a sheet supporting roller 137. The roller 137 is carried on the cross pin 138 which has its ends journaled in a pair of spaced bearing forming bracket plates 139, the latter being secured on the upper end of a pivot pin 140. The pivot pin 140 is carried in vertically disposed relation in a socket 141 provided in a swivel arm 142. The swivel arm 142 carries at its opposite ends a pair of vertically disposed pivot support members 143 and 143' having depending pivot pins 144 and 144' on which are pivotally secured relatively short link arms 145 and 145'. The arms 145 and 145' are apertured at their other ends to slidingly receive link bars 146 and 146' which have an angled end portion 147 and 147' pivotally connected by pins 148 and 148' to clevis brackets 150 and 150' secured on the back face of the lower portion 122 of the back stop plate 121. With this arrangement the roller or wheel 137 swings with the back stop plate 121 while permitting the same to remain at the center line of the machine and to assume a transversely extending position so as to support the sheet which is delivered to the piling area as it travels over the top edge of the back stop mechanism.

The supporting bracket 120 for the back stop mechanism 21 is bolted or otherwise secured on a plate-like upright stand forming post member (FIGURE 10) located on the center line of the machine and forming part of a cross frame 151 near the transverse center of the main supporting frame 11.

Figure 11:
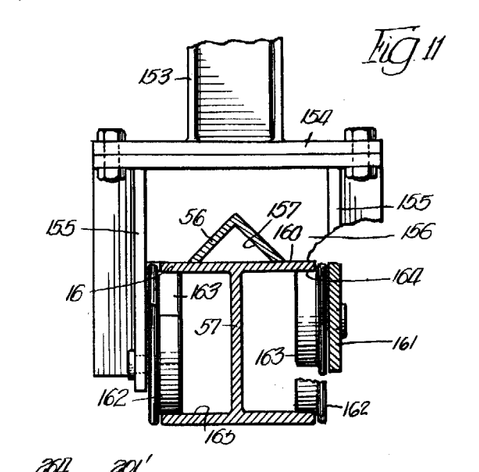
FIGURE 11 is a fragmentary cross section taken on the line 11—11 of FIGURE 2, to an enlarged scale.

The back stop mechanisms 18 and 21 are identical but their supporting structures differ somewhat. The mounting bracket or frame 120' (FIGURE 2) for the back stop mechanism 18 in the piling area 12 forms an integral part of the horizontally disposed upper end of a supporting stand 152 which has vertically disposed post forming portion 153 (FIGURE 11) carried on a movable base 154. The base 154 is in the form of a downwardly opening box-like carriage which rides on the top of the center I beam 57 (FIGURES 3 and 11) and has laterally spaced side plates 155 extending down along the open side faces of the I beam 57 connected by longitudinally spaced cross plates 156 which are notched out at 157 to accommodate the center guide rail member 56 and having their lower edges riding on the top face 160 of the I beam 57. The side plates 155 are provided with laterally spaced, forwardly directed arm forming extensions 161 and pairs of laterally spaced guide wheels 162 and 163 are carried on the side plates 155 and the extension arms 161, respectively, for engaging with the oppositely facing upper and lower flanges 164 and 165, respectively, of the I beam 57. The base or carriage 154 may be provided with any convenient form of lock (not shown) for securing the same in adjusted position longitudinally of the machine. Adjustment of the back stop mechanism 18 is provided in order to permit moving the mechanism out of the way of the entry conveyor when the latter is moved back into the piler so as to clear the space in front of the shear.

Figures 12, 15, 22, 23:
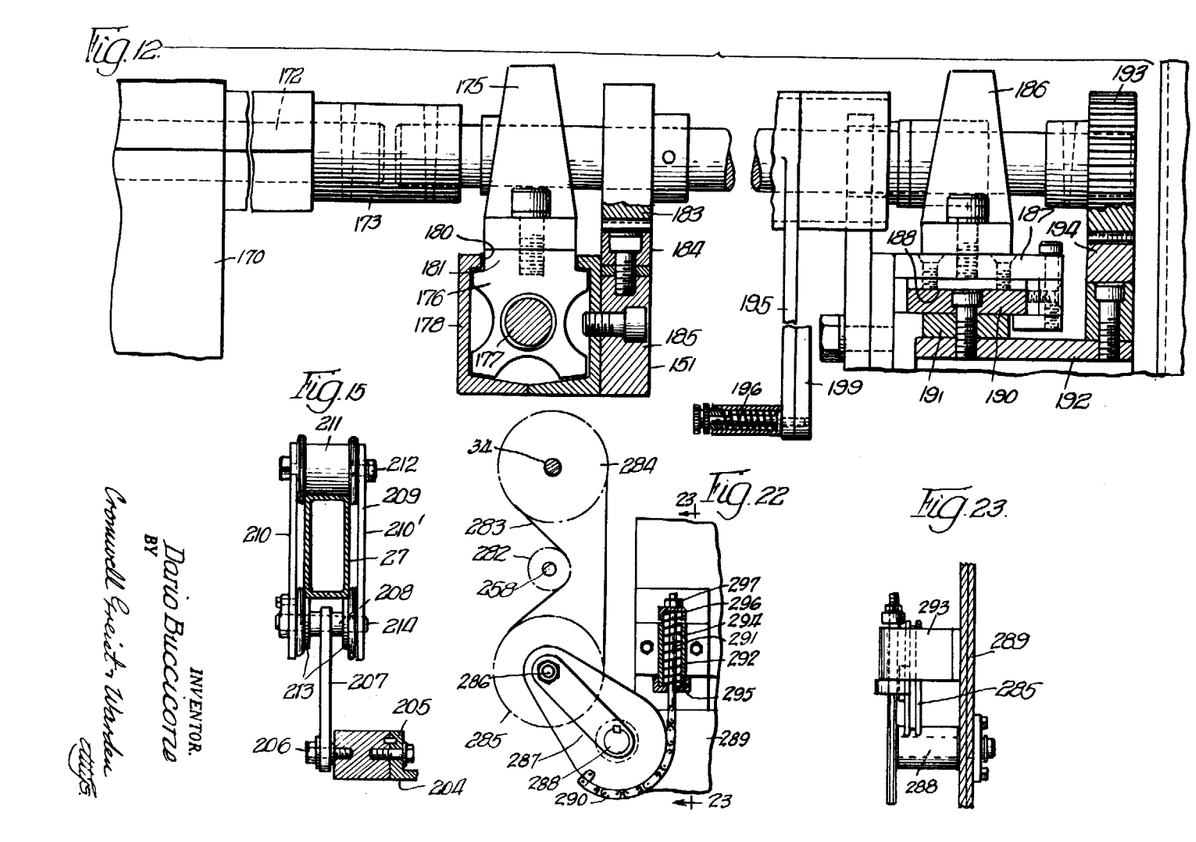
FIGURE 12 is a partial longitudinal section taken on the line 12—12 of FIGURE 1, to an enlarged scale and with portions broken away.
FIGURE 15 is a fragmentary cross section taken on the line 15—15 of FIGURE 14, to an enlarged scale.
FIGURE 22 is a fragmentary section taken on the line 22—22 of FIGURE 13, to an enlarged scale and partially schematic.
FIGURE 23 is a fragmentary section taken on the line 23—23 of FIGURE 22.

Pairs of laterally spaced side guide plates 170, 170' and 171, 171' (FIGURES 1, 2, 3 and 12), are provided in the piling areas 12 and 13, respectively. Each of the side guide plates is supported and adjusted in the same manner, both sets of plates being supported at their upper edges on longitudinally extending pivot shafts 172 and 172' which may be made in one or more sections, and which are laterally spaced on opposite sides of the end stop and back stop mechanisms and mounted to swing in an outward direction from parallel vertical planes, in which they are operative, to horizontal planes, where they are inoperative, in order to permit the pile of sheets to be removed from the machine from either side thereof. The shafts 172 and 172' extend the length of the machine and provide pivot supports for both sets of side guide plates 170, 170' and 171, 171'. The shafts 172 and 172' are supported at their opposite ends and at the center of the machine for adjustment laterally of each other. Preferably, each of the shafts is formed in two sections as shown so that each set of side guides may be disconnected for removal and replacement, without regard to the other set thereof. The two shaft sections are coupled by a connecting member indicated at 173 (FIGURE 12).

The shaft 172 is supported at its center in a bearing block 175 which is mounted on a traveling nut 176 carried on an adjusting screw 177 which is journaled in opposite ends of a housing 178, the latter extending transversely of the machine and forming the top cross beam of the center cross frame 151 of the main supporting frame 11. The nut housing 178 may be conveniently formed by two oppositely facing channels which have their top flanges cut back to form a guide slot 180 in the top face thereof for accommodating an upwardly extending portion 181 of the nut 176 on which the bearing block 175 is mounted. The adjusting screw 177 has right and left hand threads extending from the center of the screw towards the opposite ends so as to provide for opposite travel of the nut 176 and the corresponding nut for the shaft 172' on the opposite side of the machine. The adjusting screw 177 is provided with a hand wheel 182 at one end thereof for operating the same. The shaft 172 carries a pinion 183 at its center which engages with a motion equalizing rack 184 mounted on a support plate 185 which is secured to the side face of the nut housing 178. The oppositely disposed shaft 172' is provided with a like pinion for engaging with the rack 184.

The side guide supporting shafts 172 and 172' are mounted at the ends of the machine in bearing supports which are identical and provided with identical movement equalizing mechanism. As shown in FIGURE 12, the shaft 172 is supported at its one end in the bearing block 186 which is mounted on the top of a slide or carriage 187. The carriage 187 is formed with a downwardly facing recess 188 which forms a guideway for receiving a track forming bar or plate 190, the latter being mounted on a support plate 191 of lesser width, which is in turn secured on a relatively wide, transversely extending plate 192 which forms part of the end frame at the entry end of the machine. The shaft 172 carries on its end a pinion 193 which engages with a rack 194 also supported on the cross plate member 192 so that upon rotation of the shaft 177 the rack and pinion connections at opposite ends of the shaft 172 equalize the transverse movement of the shaft and the side guide members 170 and 171 which it supports, and the corresponding rack and pinion connections at the center and the ends of the shaft 172' on the opposite side of the machine cooperate to insure that the side guides will be held in parallel plates while they move toward and from the center of the machine during adjustment.

The side guide support shafts 172 and 172' each carry a pair of operating arms 195 and 195' (FIGURES 3 and 12) each of which extends radially of the supporting shaft and has its innermost edge approximately in the plane of the guide plates carried on the shaft. A spring pressed lock bolt 196 (FIGURE 12) is mounted on the free end of each arm for engagement with cooperating peripherally spaced apertures 197 and 198 (FIGURE 3) in a segment plate 199 which is mounted on the inner face of the carriage 187 so as to enable the side guide plates to be locked in a vertical plane or operative position, as shown in FIGURE 3, or in an upwardly swung open and inoperative position to permit a pile of sheets to be moved sidewise out of the machine.

The cut sheets are delivered to the entry end of the machine by the shear (not shown) and fed beneath the conveyor 10 by the sheet feeding or entry conveyor 14 which is disposed in a horizontal plane at the entry end of the machine and receives the sheets from the shear. This conveyor is of special construction so that it is adapted to be adjusted to receive sheets of different shape or having different angularity on the transverse edges which are formed by the shear cut, the shear being of the type which is adapted to be adjusted to cut at different angles transversely of the traveling web.

The conveyor 14 comprises (FIGURES 1, 2, 13 and 14) a horizontally disposed rectangular frame 200 consisting of laterally spaced side channels 201 and 201' which face outwardly and connecting transversely extending cross bars 202 and 203, the former being at the outer ends of the side channels 201 and 201', and the latter being spaced inwardly of the inner ends thereof which extend into the piler. Side rails 201 and 201' are connected at the piler ends to the inner ends of laterally extending horizontal bracket plate members 204 and 204' which have vertically disposed parallel flanges 205 and 205' at their outermost edges, with inward extensions which are connected by pivots 206 and 206' to the lowermost ends of vertically disposed links 207 and 207'. The links 207 and 207' have their uppermost ends connected by pivots 208 and 208' to supporting carriages 209 and 209', the latter being mounted on the top side rails 27 and 27' of the main frame of the piler.

The carriages 209 and 209' are identical. Each comprises (FIGURES 13 to 15) laterally spaced side plates 210 and 210' of triangular shape with a spool-type truck roller 211 rotatably mounted on the shaft 212 at the upper apex. Two pairs of flanged rollers 213 are mounted in longitudinally spaced relation at the lower corners of the plates 210, 210' on the shafts 214 and 215. The pivot pin 206 is located between the shafts 214 and 215 and the link 207 is urged in the direction of the piler by a tension spring 216 secured at one end to an intermediate portion of the link 207 and at the other end to a cross pin 217 extending between the forward ends of the side plates 210 and 210'. Suitable pivoted hooks (not shown) are provided on the posts 25 and 25' for engaging the pivots 206 and 206' when the conveyor is in operative or extended position (FIGURE 14) to hold the links 207 and 207' against movement.

The frame 200 is transversely centered and supported for movement longitudinally of the machine on a cross roller 220 (FIGURES 1, 2, 13 and 17) which carries flanges or collars 221 at its outer ends and is rotatably supported on a fixed cross shaft 222 having the ends thereof mounted in upwardly opening slots in bearing brackets 223 which are mounted on transversely spaced, longitudinally extending frame rails 224 of an end supporting structure 225 at the entry end of the piler. The end supporting structure 225 comprises vertically disposed side frame members 230 and 230' extending longitudinally from the end posts 25 and 25' of the main frame 11 of the machine and connected at their upper outer end by a cross beam member 231.

The side channels 201 and 201' of the conveyor frame 200 are each provided with a vertical depending shoe plate 232 (FIGURE 17) which engages with an end portion of the support roller 220 to hold the frame in alignment as it is moved on the roller 220.

Mechanism is provided for moving the frame 200 and the entry conveyor mechanism mounted thereon longitudinally of the machine. An adjusting shaft 235 (FIGURES 1, 13 and 16) is journaled between the side frame members 230 and 230' and carries an operating hand wheel 236 at one end thereof. The adjusting shaft 235 extends below the frame 200 and carries a pair of axially spaced pinions 237 which engage with racks 238 secured on the bottom flanges of the side channel members 201 and 201' of the conveyor frame 200. Rotation of the shaft 235, of course, moves the entire conveyor assembly 14 in a horizontal plane toward and from the shear blade or into and out of the piler machine.

The conveyor frame 200 supports three longitudinally extending, transversely spaced roller chain conveyor units 240, 241 and 242 (FIGURE 13) with the middle unit 240 being arranged on the longitudinal center line of the conveyor and the two side units 241 and 242 being spaced laterally therefrom and in parallel relation. The three units 240, 241 and 242 are identical in construction with the middle unit 240 being mounted in relatively fixed relation on the cross frame end members 202 and 203 and the two side units 241 and 242 being mounted for longitudinal adjustment so that the ends of the units which are adjacent the shear may each be moved to a point close to the line of operation of the shear blade, when the latter is adjusted for the desired diagonal cut across the web.

Since the rail units 240, 241 and 242 embody identical construction, only one will be described in detail. The center unit 240 (FIGURES 13 to 19) comprises two parallel chain supporting members 243 and 244 which are channel-shaped in cross section and arranged with their web portions in vertically spaced relation and their edge flanges extending in opposite directions. The vertical spacing between the webs of the two channel members corresponds to the depth of the cross rails 202 and 203 on the frame 200 and the chain supporting members 243 and 244 straddle these cross rails on the frame. The two supporting channels 243 and 244 may be divided into sections and a suitable splice arrangement (not shown) provided to adjust the length of the unit and maintain tension in the endless conveyor chains 245 and 245'. The chains 245 and 245' are carried on the upwardly and downwardly facing flanges of the support channels 243 and 244 so that they move in laterally spaced, vertical planes, with the channel flanges forming tracks for the same throughout the length of the unit. The chains 245 and 245' are supported at the ends of the channels 243 and 244 on end sprocket formations 246 and 247 which are mounted on cross shafts 248 and 249 supported between clevis-like end bearing bracket members 250 and 251. Sheet supporting rollers 252 are carried between the chains 245 and 245' with each of the rollers 252 comprising a supporting pin or shaft 253 extending between the chains and a sleeve 254 on which three roller sections are mounted. The two outside sections 255 and 255' of each of the rollers 252 are of rubber or similar material and the center section 256 is a permanently magnetized material. The center roll section 256 is somewhat smaller in diameter than the two outside roll sections 255 and 255'. The rollers 252 are spaced at equal distances along the chains 245 and 245'.

Figures 16, 18:
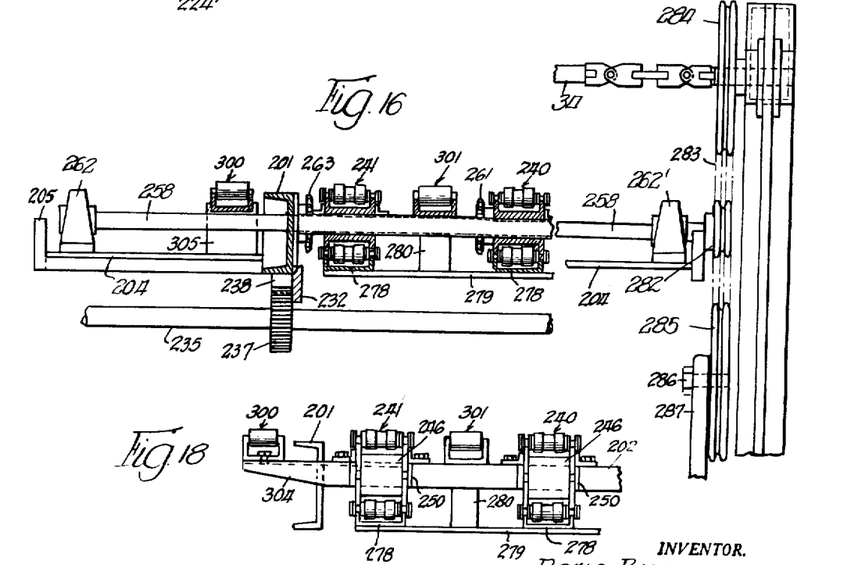
FIGURE 16 is a partial cross section taken on the line 16—16 of FIGURE 13, to an enlarged scale and with portions broken away.
FIGURE 18 is a partial end elevation taken on the line 18—18 of FIGURE 13, to an enlarged scale and with portions broken away.

The center roller chain conveyor unit 240 (FIGURE 13) is secured in relatively fixed relation on the cross beams 202 and 203 of the conveyor frame 200 by angle brackets 257 and 257' which are bolted or otherwise fastened to the conveyor members and the cross beams. The center unit 240 is driven from a cross drive shaft 258 by means of a drive sprocket 259 which is provided on an extended end of the shaft 249 at the inner end of the unit and a drive chain 260 which connects the sprocket 259 with a sprocket 261 on the drive shaft 258 (FIGURES 13 and 16). The drive shaft 258 is supported by transversely spaced bearings 262 and 262' on the laterally extending plate members 204 and 204' of the conveyor frame 200.

Figure 20:
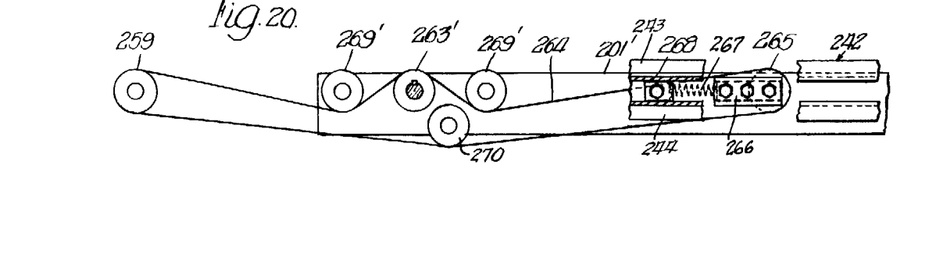
FIGURE 20 is a fragmentary longitudinal section taken on the line 20—20 of FIGURE 13, to an enlarged scale, with portions shown schematically and with other portions broken away.
Figure 21:
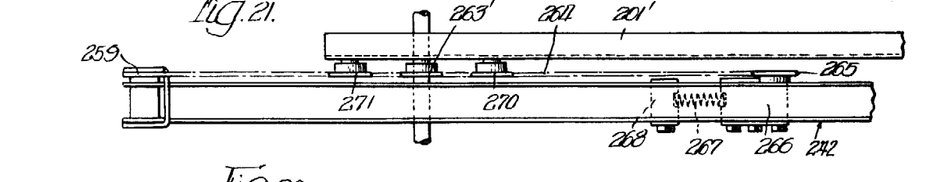
FIGURE 21 is a fragmentary plan view of the mechanism of FIGURE 20.

The two outside roller chain units 241 and 242 are driven from the drive shaft 258 in an identical manner which differs somewhat from the drive for the unit 240. The shaft 258 carries axially spaced drive sprockets 263 and 263' (FIGURES 13, 16, 20 and 21) which are connected by drive chains 264 and 264' to the drive sprockets 259 of the respective rail units 241 and 242. As shown in FIGURES 20 and 21, the unit 242 is provided with a sprocket 265 which is mounted on a slide block 266 set between the top and bottom chain support members 243 and 244 at a point intermediate the ends of the unit. The slide block 266 is urged in the direction of the far end of the unit or away from the drive shaft 258 by a compression spring 267 which has its one end seated in a recess in one end of the block and its other end seated in a recess in a cross plate or bar member 268 which is fixed between the unit frame members 243 and 244, the tension spring thus applying tension in the drive chain 264 which extends between the sprocket 265 and the drive sprocket 259 at the end of the rail unit. The upper run of the chain 264 engages with the drive sprocket 263' on the drive shaft 258 and also engages with two idler sprockets 269 and 269' which are mounted in longitudinally spaced relation on the adjacent side frame member 201' as shown in FIGURE 20. The lower run of the chain 264 engages with an idler sprocket 270 which is mounted on a suitable stub shaft journaled on the side frame member 201' below the drive shaft 258. The rail unit 241 at the other side of the conveyor is driven by a like mechanism connecting its end sprocket 259 with the sprocket 263 on the drive shaft 258. With this arrangement the position of the side rail units 241 and 242 may be adjusted longitudinally within the frame 200 without disconnecting their drive connection with the cross shaft 258.

Figures 17, 19:
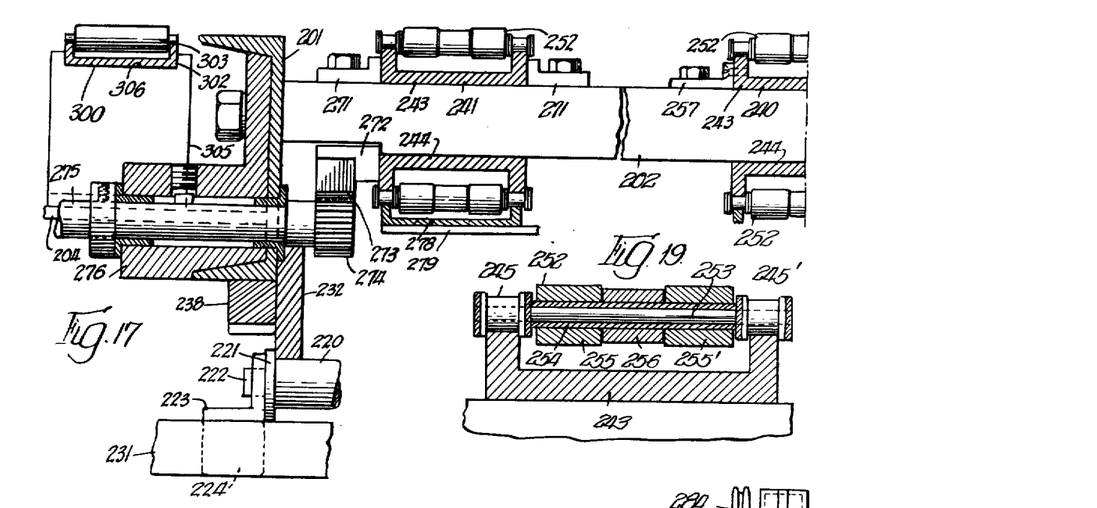
FIGURE 17 is a partial cross section taken on the line 17—17 of FIGURE 13, to an enlarged scale.
FIGURE 19 is a fragmentary cross section taken on the line 19—19 of FIGURE 13, to an enlarged scale.

The mechanism for adjusting the position of the side rail units 241 and 242 on the frame 200 is illustrated in FIGURES 13 and 17. The side unit 241 which is shown in FIGURE 17 is slidably held on the frame cross members 202 and 203 by guideway forming angle members 271 and 271' which have their horizontal flanges secured to the cross frame members and their laterally spaced, vertical flanges extending upwardly along the top frame channel 243 of the unit. The unit carries along its outer bottom edge an angle bar 272 (FIGURE 17) on which is mounted a downwardly facing rack 273 which engages with an operating pinion 274. The pinion 274 is secured on the inner end of a shaft 275 which is journaled in a bearing 276 supported on the side frame member 201. The shaft 275 extends horizontally through the web of the side channel 201 and has a hand wheel 277 (FIGURE 13) at its outer end. Rotation of the hand wheel 277, of course, moves the unit 241 longitudinally of the frame 200. The rail unit 242 at the opposite side of the conveyor is mounted for sliding movement on the cross frame members 202 and 203 in the same manner and has a like adjusting mechanism with hand wheel 277' for controlling its position.

The lower runs of the conveyor chains 245 and 245' on the chain conveyor units 240, 241 and 242 are supported against sagging by support members 278 (FIGURES 16 to 18) which have a channel-shaped cross section and which are mounted in upwardly facing relation on cross bars 279 with the latter being suspended beneath the conveyor frame 200 by spacer brackets 280 depending from the frame cross members 202 and 203. The chains slide on the upper edges of the upwardly directed flanges of the support members 278 which are positioned in spaced and vertically aligned relation beneath the downwardly extending flanges of the lower channels 244 of the conveyor units.

The drive shaft 258 for the chain units is journaled at its opposite ends in bearings 262 and 262' which are supported on the laterally extending bracket plates 204 and 204', respectively. The shaft 258 carries at its one end a sprocket 282 which engages with the forward run of the drive chain 283 (FIGURES 22 and 23), the latter extending between the vertical disposed sprockets 284 and 285. The upper sprocket 284 is mounted on the extended end portion of the shaft 34 on which the idler pulleys for the overhead magnetic conveyor units are mounted. The lower sprocket 285 is rotatably mounted on a stub shaft 286 on the free end of a lever arm 287. The lever arm 287 is mounted at its other end on a pivot 288 which extends from the bracket 289 which is fixed in vertical relation on the main frame of the machine. The lever arm 287 has a semicircular section at its pivoted end around the outsde edge of which a pull chain 290 is positioned with the one end secured to the edge of the lever arm 287 and the other end secured to a pin 291 on the opposite side of the pivot 288 which pin 291 is disposed in vertical relation in a housing 292 mounted by means of the bracket 293 on the fixed bracket plate 289. A compression spring 294 is mounted on the pin 291 with its lower end engaging with a cap 295 on the housing 292 and its other end abutting a cap 296 which is held in adjusted position on the threaded upper end of the pin 291 by the nut 297 so as to permit adjustment of the tension in the spring 294. This arrangement permits swinging or floating movement of the sprocket 285 under the pull of the chain 290 and spring 294 with the swinging movement of the sprocket 285 being limited by the chain 283. The sprocket 282, of course, is movable into and out of engagement with the forward run of the chain 283 as the frame 200 is moved a predetermined distance into and out of the piler machine.

Idler roll units 300, 300' and 301, 301' (FIGURES 16, 17 and 18) are associated with the laterally spaced, driven chain units on the frame 200. Each of these idler roller units is in the form of an upwardly opening channel support 302 with a series of longitudinally spaced idler rollers 303 mounted between the flanges of the support channel 302. The inside idler roll units 301 and 301' which are on opposite sides of the center chain conveyor unit 240 may be bolted or fixed in any desired manner on the cross frame members 202 and 203. The outside idler roll units 300 and 300' are mounted on supporting brackets 304, 305, 304' and 305'. The brackets 304, 304' are secured in outwardly extending relation on the outside roller chain units 241 and 242. The brackets 305, 305' are angle brackets mounted on the horizontal plate members 204 and 204', respectively. Each of these brackets has an upstanding flange with a slot 306 (FIGURE 17) in the upper edge forming a guideway for slidingly receiving the channel 302 of the idler unit.

In the operation of the piler the entry or feed conveyor 14 (FIGURE 13) is first adjusted longitudinally of the frame 11 by rotation of hand wheel 236 to bring the center chain conveyor unit 240 to the proper position relative to the vertical axis of the oscillating shear blade and the entire conveyor 14 is locked in position on the main frame 11. The side chain conveyor units 241 and 242 are then adjusted longitudinally of the conveyor frame 200 by rotation of the hand wheels 277 and 277' to the proper position, as close as possible to the cutting plane or planes of the shear blade. The chain conveyor drives are all automatically connected upon proper adjustment of the frame 200 and the side chain units 241 and 242 with the drive chain 283 (FIGURES 13 and 20 to 22) which is driven from the shaft 34 of the overhead magnetic conveyor 10. After the entry conveyor is adjusted the supporting frame 152 for the back stop 18 in the piling area 12 is moved to its proper position and locked. The back stops 18 and 21 are both adjusted to position their faces at the proper angle for engaging the trailing ends of the sheets. The end stop mechanisms 17 and 20 are adjusted longitudinally of the frame 11 the proper distance from the back stops 18 and 21 for piling in the areas 12 and 13, the buggies 15 and 16 being also moved into pile receiving position. The side guide supports 172 and 172' (FIGURE 3) are adjusted to the proper lateral spacing for the width of the sheets and the side guide plates are lowered into vertical position. Successive sheets are then delivered to the main conveyor 10 and the magnets in the latter are controlled by suitable sheet operated switches (not shown) to drop the sheets alternately in the piling areas 12 and 13.

When it is desired to move the entry conveyor 14 away from the shear the back stop 18 is first released and its carriage moved forward a sufficient distance to permit movement of the conveyor frame 200 into the piler without interference. The conveyor 14 may then be unlocked and moved bodily into the piler, with the leading end of the conveyor being supported on the carriages 209 and 209' (FIGURES 1, 2, 13 and 14) and being lowered by movement of the link bars 207 and 207' to clear the bottom of the main conveyor assembly 10. This provides for access to the shear and permits adjustment of the conveyor 14 for receiving the various shapes which the shear is capable of delivering with the sheets having maximum support as they leave the shear. The roller chain units on the conveyor 14 are continuously driven but support the sheets while they are stopped during the cutting operation without any drag on the sheets, due to the mounting of the rollers for free rotation on the chains, and immediately upon the sheets being freed by completion of the cut they are advanced by movement of the chains into the piler.

While particular materials and specific details of construction have been referred to in describing the form of the piler illustrated, it will be understood that other materials and equivalent structural details may be employed within the spirit of the invention.

I claim:

1. In a piling apparatus for metal sheets, having a rectangular supporting frame with longitudinally extending, laterally spaced top side rail members and a longitudinally extending overhead magnetic conveyor mounted between said top side rail members, said magnetic conveyor having means for advancing successive sheets on the lower face thereof to a piling area and for releasing the same for deposit on a pile in said area, a horizontally disposed sheet feeding conveyor at the entry end of said magnetic conveyor comprising a rectangular frame having one end positioned between said top side rail members and beneath the entry end of said magnetic conveyor, a series of elongate, transversely spaced, rail-like conveyor units mounted on said rectangular frame, each of said units comprising spaced endless chains, and a series of rollers mounted in freely rotatable and longitudinally spaced relation on said chains, means to drive said chains, means to adjust said conveyor units longitudinally of said frame, means to support the outer end of said entry conveyor for horizontal movement on said supporting frame, carriages mounted for longitudinal movement on said top side rail members, and depending link members pivotally connected to said carriages and to the inner end of said entry conveyor frame for supporting the inner end of said entry conveyor for lowered inward movement beneath said magnetic conveyor.

2. In an apparatus for piling metal sheets which are cut from an advancing web by a shear having a blade mounted for oscillating movement about a vertical axis extending in the center of the path of advance of the web so that successive cuts are made in different transverse planes, said piler apparatus comprising an upright supporting frame and an elongate overhead magnetic conveyor extending longitudinally on said supporting frame and having means for advancing the sheets on the bottom face thereof and for releasing the sheets for deposit on a pile, an entry conveyor for receiving the sheets from the shear and delivering the same to the magnetic conveyor, said entry conveyor comprising a rectangular frame mounted for longitudinal adjustment on the piler supporting frame at the receiving end of said magnetic conveyor, a series of transversely spaced, rail-like conveyor units mounted on said frame, each of said units having a pair of laterally spaced chains, elongate chain supporting frame members, end sprockets at each end thereof and a series of longitudinally spaced sheet engaging rollers mounted for free rotation between the pair of chains, one of said rail units being fixed on said rectangular frame and extending along the longitudinal center thereof, other rail units being slidably mounted on said rectangular frame on opposite sides of said center unit and having their free ends extending beyond the end of said rectangular frame, means to adjust the longitudinal position of the side rail units individually and means to adjust said rectangular frame longitudinally of said piler supporting frame so as to position the free ends of said rail units closely adjacent to the cutting planes of the shear blade.

3. In an apparatus for piling metal sheets which are cut from an advancing web by a shear having a blade mounted for oscillating movement about a vertical axis extending in the center of the path of advance of the web so that successive cuts are made in different transverse planes, said piler apparatus comprising an upright elongate supporting frame and an elongate overhead magnetic conveyor extending longitudinally on said supporting frame and having means for advancing the sheets on the bottom face thereof and for releasing the sheets for deposit on a pile, an entry conveyor for transferring the sheets from the shear to the bottom face of the magnetic conveyor, said entry conveyor comprising a rectangular frame mounted for longitudinal adjustment on the supporting frame and having its inner end extending beneath the receiving end of said magnetic conveyor, a series of transversely spaced, rail-like conveyor units mounted on said frame, each of said units having a pair of laterally spaced chains, elongate chain supporting frame members, end sprockets at each end thereof and a series of longitudinally spaced, sheet engaging rollers mounted for free rotation between the pair of chains, one of said rail units being fixed on the longitudinal center line of said rectangular frame, other rail units being mounted in slidable relation on said rectangular frame on opposite sides of said center unit and having their outer ends extending beyond the outer end of said longitudinal frame, means to adjust the longitudinal position of the individual side rail units on said longitudinal frame, means to adjust said rectangular frame longitudinally of said piler supporting frame, so as to position the free ends of said rail units closely adjacent to the cutting planes of the shear blade, a transversely extending drive shaft mounted on said longitudinal frame, means to connect said drive shaft in driving relation with the chain supporting sprockets on the inner ends of the individual rail units, and drive means on said piler frame connected to said drive shaft.

4. In an apparatus for piling metal sheets which are cut from an advancing web by a shear having a blade mounted for oscillating movement about a vertical axis extending in the center of the path of advance of the web so that successive cuts are made in different transverse planes, a piler apparatus comprising an upright supporting frame and an elongate overhead magnetic conveyor extending longitudinally on said supporting frame and having driven belts supported on end pulleys and spaced electromagnets for holding sheets on the bottom face thereof and means to control the electromagnets for releasing the sheets for deposit on a pile, an entry conveyor for moving the sheets from the shear to the bottom face of the magnetic conveyor, said entry conveyor comprising a rectangular frame mounted for longitudinal adjustment on the supporting frame at the receiving end of said magnetic conveyor, a series of transversely spaced, rail-like conveyor units mounted on said frame, each of said units having a pair of laterally spaced chains, elongate chain supporting frame members with end sprockets at each end thereof and longitudinally spaced sheet engaging rollers mounted for free rotation between the pair of chains, one of said rail units being mounted on said rectangular frame for a longitudinal alignment with the vertical axis of the shear blade, other rail units being slidably mounted for longitudinal adjustment on said rectangular frame on opposite sides of said center unit having opposite ends extending beyond the ends of said rectangular frame, means to adjust the longitudinal position of the individual side rail units and means to adjust said rectangular frame longitudinally of said supporting frame so as to position the free ends of said rail units closely adjacent to the cutting planes of the shear blade, a driven shaft extending transversely of said rectangular frame, means connecting said drive shaft in driving relation with the chains on each of said rail units, and drive means connecting said drive shaft with the end pulleys on the magnetic conveyor.

5. Apparatus for handling metal sheets of non-rectangular shape which are cut successively from an advancing web by an oscillating shear blade operated to make successive cuts in two different diagonally extending, transverse planes so that alternate sheets are alike and successive sheets have corresponding side edges facing in opposite directions, said apparatus comprising a supporting frame having two adjacent piling areas, an overhead magnetic conveyor extending longitudinally on said supporting frame above said piling areas and having control means which is operative to advance successive sheets delivered to the receiving end thereof to the two piling areas and to release alternate sheets for deposit on a pile in each of the piling areas, a transfer conveyor for receiving successive sheets cut by the shear and for delivering the sheets to the bottom face of the magnetic conveyor, said transfer conveyor comprising a rectangular frame mounted on one end of said supporting frame for movement in a generally horizontal plane and in the direction longitudinally of the piler supporting frame, said rectangular frame having longitudinally spaced cross rails adjacent the inner and outer ends thereof, and a plurality of rail-like conveyor units mounted for longitudinal sliding movement on said cross rails, each of said rail units comprising vertically spaced channel members arranged with the edges of their flanges facing in opposite directions, said channel members being positioned astraddle the cross rails of said rectangular frame and slidable thereon, pairs of laterally spaced chains carried on said channel flanges, roller shafts extending between said chains and sheet engaging rollers mounted in freely rotatable relation thereon, a common drive means connected to the chains of each rail unit and means to adjust the position of each rail unit longitudinally of said rectangular frame without disconnecting said drive means.

6. A conveyor for handling metal sheets comprising an elongate rectangular frame having side rails and longitudinally spaced connecting cross rails, elongate rail-like assemblies mounted on said cross rails, each of said rail-like assemblies comprising relatively narrow, elongate, vertically spaced frame members having vertically disposed, laterally spaced chain guide forming members extending in opposite directions in parallel planes and end sprockets at opposite ends of said guide rail forming members, a pair of endless chains supported on said guide rail forming members and said end sprockets, roller shafts extending between said chains in longitudinally spaced relation, a sleeve member mounted for free rotation on each of said roller shafts and roller sections mounted on said sleeve with one of said roller sections being a magnet and having a smaller diameter than the adjoining roller sections.

7. In a sheet piling apparatus, having a supporting frame and an overhead conveyor for advancing successive sheets on the bottom face thereof to a piling area and for releasing the same for deposit on a pile in said area, a sheet feeding conveyor at the entry end of said overhead conveyor comprising a rectangular frame mounted on said supporting frame, a series of elongate, transversely spaced, rail-like conveyor units of substantially equal length mounted on said rectangular frame, each of said units comprising a pair of elongate, vertically spaced chain supporting members which are mounted for longitudinal movement, a pair of endless chains mounted thereon for movement in transversely spaced, vertical planes, and a series of roller shafts mounted in longitudinally spaced relation between said chains, rollers mounted in freely rotatable relation on said roller shafts, a transverse drive shaft, drive means connecting the chains of each conveyor unit with said drive shaft for continuously operating said chains, and means to adjust the chain supporting members of the individual conveyor units in the direction longitudinally of said frame so that the ends of said units may be aligned at various angles across the end of the conveyor frame.

8. In a sheet piling apparatus having a supporting frame and an overhead conveyor for advancing successive sheets to a piling area and releasing the same for deposit on a pile in said area, a horizontally disposed sheet feeding conveyor at the entry end of said overhead conveyor comprising a rectangular frame mounted on said supporting frame, a plurality of elongate, transversely spaced, rail-like conveyor units of substantially equal length mounted on said rectangular frame, each of said units comprising a pair of oppositely facing, vertically spaced chain supporting channel members mounted for longitudinal movement, a pair of transversely spaced endless chains supported on the flanges of said channel members and on end sprockets at the ends of said channel members, a series of longitudinally spaced roller shafts extending between said chains, rollers having peripheral surfaces of resilient material mounted in freely rotatable relation on said roller shafts, a transverse drive shaft, drive means connecting said chains to said drive shaft to drive said chains continuously, means to adjust the chain supporting channel members of the individual conveyor units longitudinally of said frame so that the conveyor units may be adjusted relative to each other without disconnecting said drive means, and means to adjust said entry conveyor frame longitudinally of said supporting frame.

References Cited in the file of this patent

UNITED STATES PATENTS

| | | |
|---|---|---|
| 2,608,288 | Talbot | Aug. 26, 1952 |
| 2,703,239 | Curran et al. | Mar. 1, 1955 |
| 3,037,548 | Hasselquist | June 5, 1962 |

UNITED STATES PATENT OFFICE
CERTIFICATE OF CORRECTION

Patent No. 3,111,311                         November 19, 1963

Dario Buccicone

It is hereby certified that error appears in the above numbered patent requiring correction and that the said Letters Patent should read as corrected below.

In the grant, lines 2 and 12, and in the heading to the printed specification, lines 4 and 5, for "Buccicone Engineering Co., Inc.", each occurrence, read -- Bucciconi Engineering Co., Inc. --; column 2, line 72, for "paralellogram" read -- parallelogram --; column 3, line 37, for "equal" read -- equally --; column 11, line 7, for "vertical" read -- vertically --; line 17, for "outsde" read -- outside --.

Signed and sealed this 2nd day of June 1964.

(SEAL)
Attest:

ERNEST W. SWIDER
Attesting Officer

EDWARD J. BRENNER
Commissioner of Patents